US012634683B2

(12) United States Patent
Mayalil et al.

(10) Patent No.: US 12,634,683 B2
(45) Date of Patent: May 19, 2026

(54) DYNAMIC FEATURE-DEPENDENT PROFILE PROVISIONING FOR WIRELESS DEVICES

(71) Applicant: Apple Inc., Cupertino, CA (US)

(72) Inventors: Stanley M. Mayalil, San Jose, CA (US); Rajeev Verma, San Jose, CA (US); Hyewon Lee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 539 days.

(21) Appl. No.: 18/183,095

(22) Filed: Mar. 13, 2023

(65) Prior Publication Data

US 2024/0314549 A1 Sep. 19, 2024

(51) Int. Cl.
| | |
|---|---|
| *H04W 8/26* | (2009.01) |
| *H04L 61/4588* | (2022.01) |
| *H04L 101/654* | (2022.01) |
| *H04W 8/22* | (2009.01) |

(52) U.S. Cl.
CPC ......... *H04W 8/265* (2013.01); *H04L 61/4588* (2022.05); *H04W 8/22* (2013.01); *H04L 2101/654* (2022.05)

(58) Field of Classification Search
CPC ....... H04W 8/265; H04W 8/22; H04W 8/183; H04W 8/205; H04L 61/4588; H04L 2101/654
See application file for complete search history.

(56) References Cited

U.S. PATENT DOCUMENTS

| | | | | |
|---|---|---|---|---|
| 2017/0127264 | A1* | 5/2017 | Yang ................... | H04L 63/0428 |
| 2017/0289788 | A1* | 10/2017 | Lalwaney ............... | H04W 8/24 |
| 2018/0060199 | A1* | 3/2018 | Li ........................ | G06F 11/2094 |
| 2022/0104005 | A1* | 3/2022 | Xiong ................... | H04W 12/45 |
| 2022/0167147 | A1* | 5/2022 | Karimli ................... | H04W 4/50 |
| 2024/0147217 | A1* | 5/2024 | Chikkala ............... | H04W 8/183 |
| 2024/0187841 | A1* | 6/2024 | Homorodi ............. | H04W 8/205 |

FOREIGN PATENT DOCUMENTS

| | | | | | |
|---|---|---|---|---|---|
| CN | | 103648148 | A | * | 3/2014 |
| WO | WO-2022256118 | A1 | * | 12/2022 | ............ H04W 8/183 |

* cited by examiner

*Primary Examiner* — Sun Jong Kim
(74) *Attorney, Agent, or Firm* — DICKINSON WRIGHT RLLP

(57) ABSTRACT

This application describes techniques for dynamic feature-dependent electronic subscriber identity module (eSIM) profile provisioning for wireless devices, including provisioning of device-compatible eSIM profiles and mitigation of provisioned device-incompatible eSIM profiles. A wireless device can provide information regarding additional device capabilities indicating support (or lack thereof) for optional cellular wireless standard features to a provisioning server, which can select an eSIM profile matched to the wireless device. In some cases, a wireless device detects an error condition resulting from enabling a device-incompatible eSIM profile on an embedded universal circuit card (eUICC) of the wireless device, disables the errant eSIM profile, and notifies a provisioning server regarding the error condition. The provisioning server can account for the device compatibility when providing additional eSIM profiles to the wireless device.

17 Claims, 10 Drawing Sheets

100

| MOBILE NETWORK OPERATOR 114 | MNO PROVISIONING SERVER 116 |

BASE STATION 112-1

BASE STATION 112-2

BASE STATION 112-N

• • •

WIRELESS DEVICE
102

BASEBAND WIRELESS
CIRCUITRY
110

PROCESSOR(S)
104

MEMORY
106 eUICC
108

UICC
118

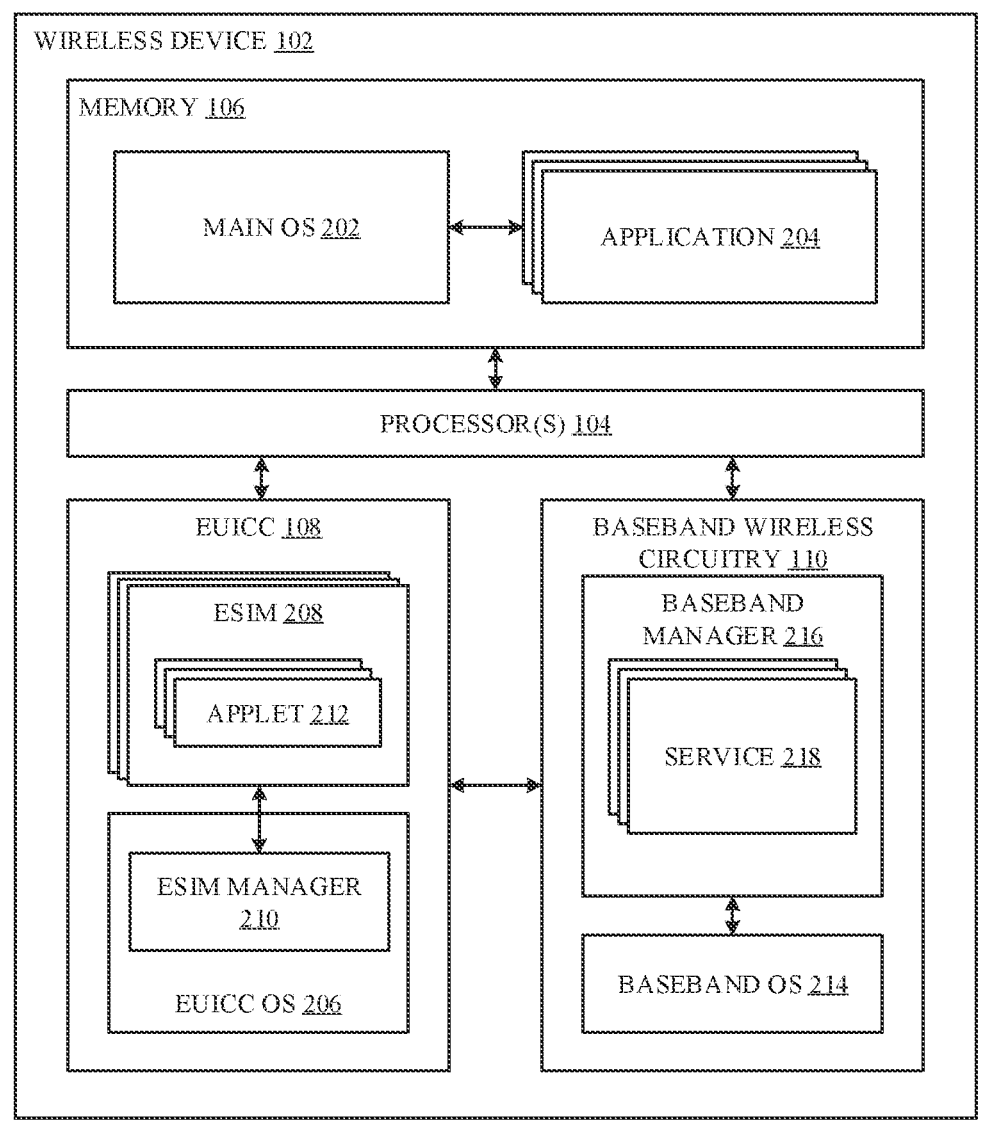
*FIG. 2*

SM-DP+ Based Device-Compatible eSIM Profile Provisioning (I)

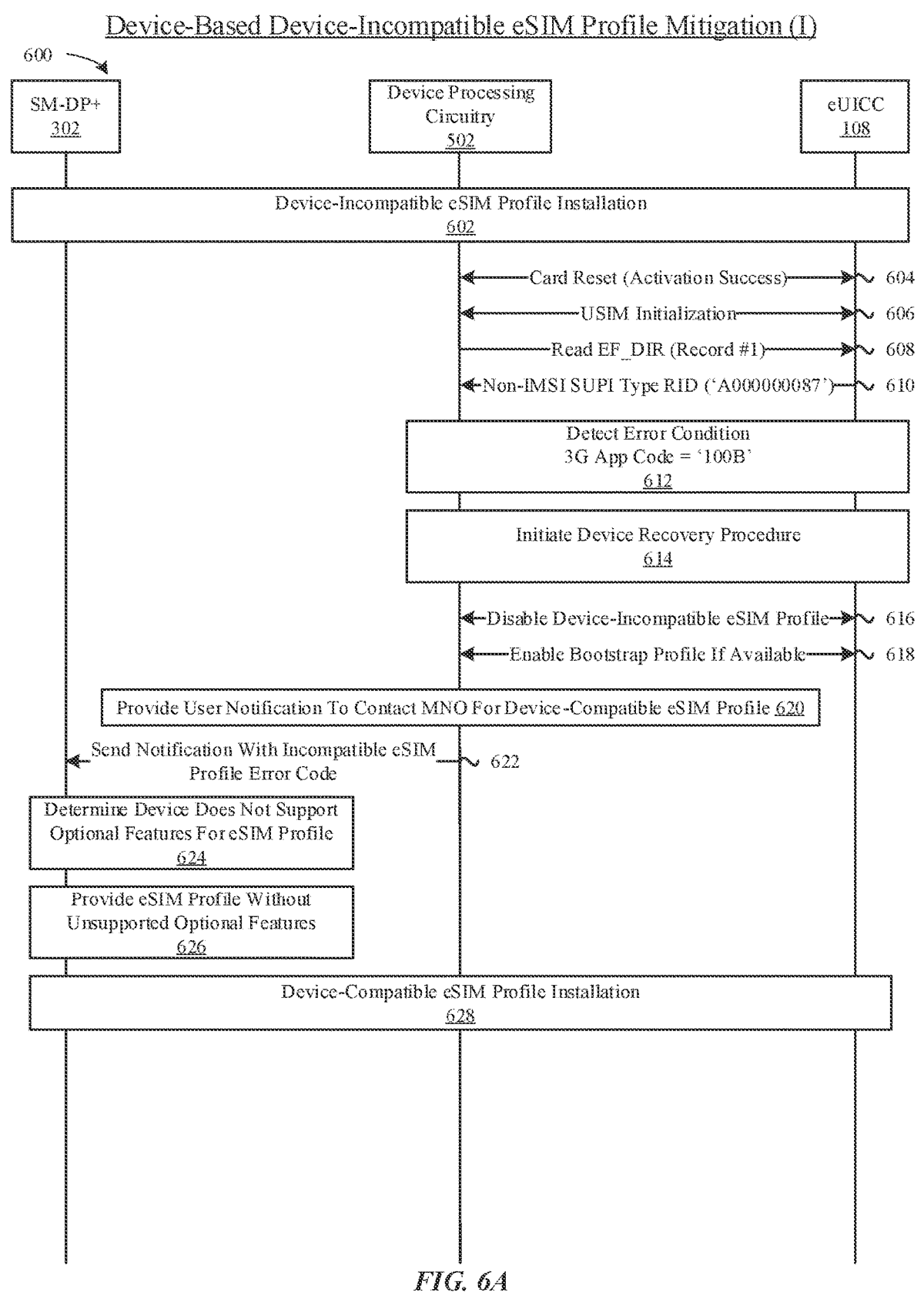

Device-Based Device-Incompatible eSIM Profile Mitigation (I)

600

| SM-DP+ 302 | Device Processing Circuitry 502 | eUICC 108 |
|---|---|---|

Device-Incompatible eSIM Profile Installation
602

Card Reset (Activation Success) ～ 604

USIM Initialization ～ 606

Read EF_DIR (Record #1) ～ 608

Non-IMSI SUPI Type RID ('A000000087') ～ 610

Detect Error Condition
3G App Code = '100B'
612

Initiate Device Recovery Procedure
614

Disable Device-Incompatible eSIM Profile ～ 616

Enable Bootstrap Profile If Available ～ 618

Provide User Notification To Contact MNO For Device-Compatible eSIM Profile 620

Send Notification With Incompatible eSIM Profile Error Code ～ 622

Determine Device Does Not Support Optional Features For eSIM Profile
624

Provide eSIM Profile Without Unsupported Optional Features
626

Device-Compatible eSIM Profile Installation
628

*FIG. 6A*

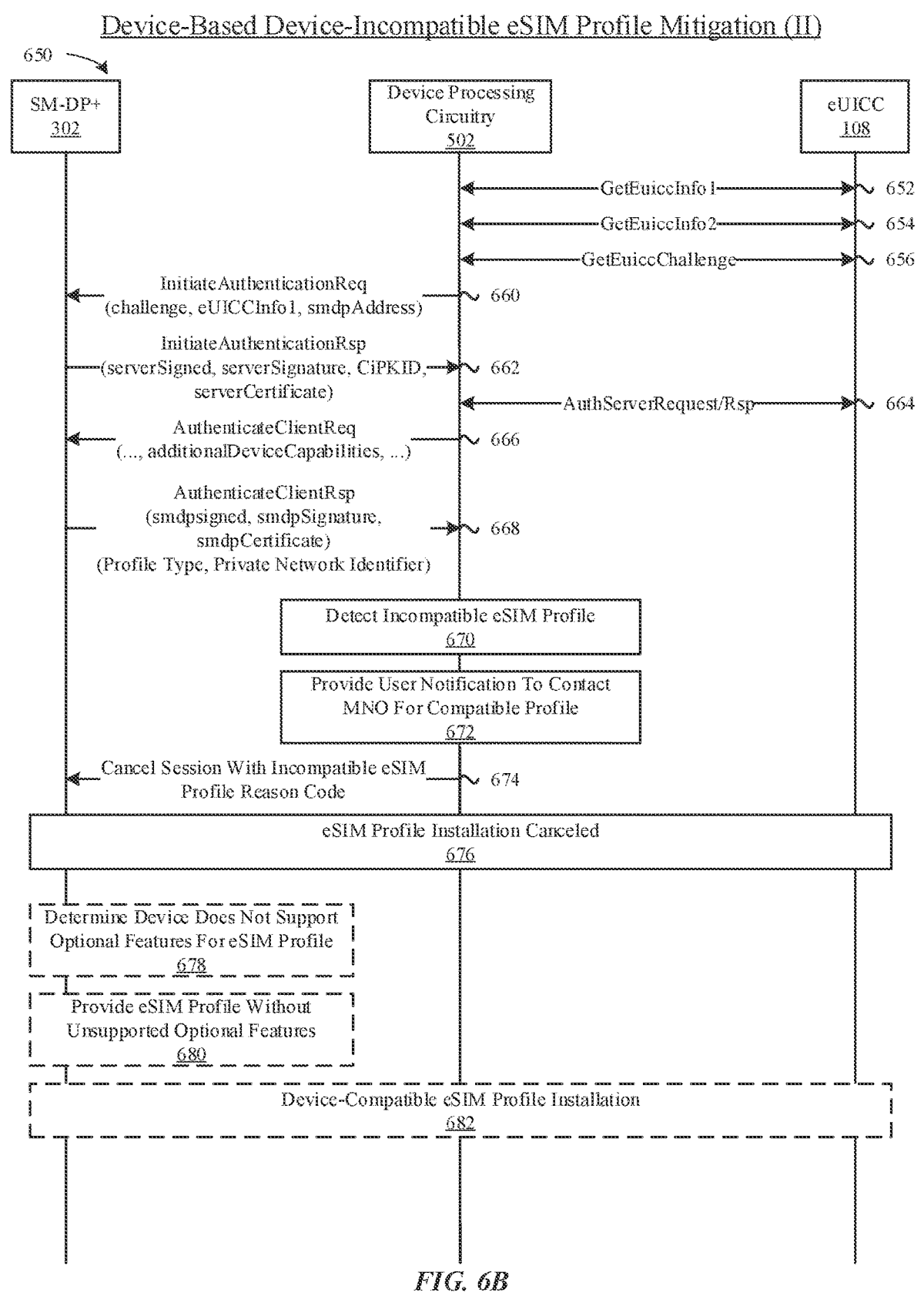

Device-Based Device-Incompatible eSIM Profile Mitigation (II)

650

| SM-DP+ 302 | Device Processing Circuitry 502 | eUICC 108 |

GetEuiccInfo1 — 652

GetEuiccInfo2 — 654

GetEuiccChallenge — 656

InitiateAuthenticationReq
(challenge, eUICCInfo1, smdpAddress) — 660

InitiateAuthenticationRsp
(serverSigned, serverSignature, CiPKID, — 662
serverCertificate)

AuthServerRequest/Rsp — 664

AuthenticateClientReq
(..., additionalDeviceCapabilities, ...) — 666

AuthenticateClientRsp
(smdpsigned, smdpSignature, — 668
smdpCertificate)
(Profile Type, Private Network Identifier)

Detect Incompatible eSIM Profile
670

Provide User Notification To Contact
MNO For Compatible Profile
672

Cancel Session With Incompatible eSIM — 674
Profile Reason Code eSIM Profile Installation Canceled
676

Determine Device Does Not Support
Optional Features For eSIM Profile
678

Provide eSIM Profile Without
Unsupported Optional Features
680

Device-Compatible eSIM Profile Installation
682

*FIG. 6B*

DYNAMIC FEATURE-DEPENDENT PROFILE PROVISIONING FOR WIRELESS DEVICES

FIELD

The described embodiments set forth techniques for dynamic feature-dependent electronic subscriber identity module (eSIM) profile provisioning for wireless devices, including provisioning of device-compatible eSIM profiles and mitigation of provisioned device-incompatible eSIM profiles.

BACKGROUND

Many wireless devices are configured to use removable Universal Integrated Circuit Cards (UICCs) that enable the wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a wireless device. Changing between profiles can be accomplished by switching SIM cards installed in the wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices. Additionally, some wireless devices, such as wearable wireless devices, home automation Internet of Things (IoT) wireless devices, and wireless equipped vehicles may not support UICCs.

Wireless communication standards are progressively updated via different numbered release versions. New features introduced in new releases may be incompatible with wireless devices configured for earlier releases. Optional features in newer releases may be unsupported in wireless devices that support mandatory features of a given release version. Compatibility checking when downloading an eSIM profile to a wireless device may be limited in scope, e.g., checking release version numbers but not checking for individual feature compatibility. There exists a need for feature-dependent eSIM profile provisioning and mitigation of error conditions that arise when device-incompatible eSIM profiles are installed in a wireless device.

SUMMARY

The described embodiments set forth techniques for dynamic feature-dependent electronic subscriber identity module (eSIM) profile provisioning for wireless devices, including provisioning of device-compatible eSIM profiles and mitigation of provisioned device-incompatible eSIM profiles. In some embodiments, a wireless device provides to a network-based provisioning server information regarding additional device capabilities indicating support (or lack thereof) for one or more optional cellular wireless standard features supplemental to device capabilities indicating support for or compliance with particular standardized release versions of particular cellular wireless radio access technologies (RATs). In some embodiments, the additional device capabilities information indicates whether the wireless device supports one or more of: i) a non-3GPP application, e.g., in place of a universal SIM (USIM) application, ii) a network access identifier (NAI) value instead of an international mobile subscriber identifier (IMSI) value, e.g. network specific identifier (NSI) for use in a standalone non-public network (SNPN) and/or non-3GPP network, Global Line Identifier (GLI) or Global Cable Identifier (GC) for use in a non-3GPP network, iii) an cSIM without a USIM application, iv) cellular communication without NAI (NSI, GLI, GCI) support, v) cellular communication with NAI (NSI, GLI, GCI) support, vi) non-cellular only communication with NAI (NSI, GLI, GCI) support, vii) basic encoding rule tag/length/value (BER-TLV) formatting for particular parameters or elementary files (EFs), viii) a reduced-capability configuration, (ix) non-terrestrial network (NTN) capability, (x) proximity services (ProSe) for LTE and 5G, or (xi) Internet of Things (IoT) capability. A network-based provisioning server can use the additional device capabilities information provided by a wireless device to determine compatibility of the wireless device with particular eSIM profiles. In some embodiments, the provisioning server dynamically selects an eSIM profile to download to and install on the wireless device based at least in part on the provided additional device capabilities information. For example, the provisioning server can select an eSIM profile with optional features when the wireless device indicates support for such features or an eSIM profile without optional features when the wireless device indicates such features are not supported. In some embodiments, the provisioning server provides an error indication without providing an eSIM profile to a wireless device when the optional features are not supported for an eSIM profile that the wireless device requests to download. In some embodiments, a wireless device detects an error condition during a provisioning procedure for an eSIM profile and implements mitigation techniques to disable the eSIM profile and in some cases re-enable a bootstrap eSIM profile on the wireless device. The wireless device can provide an error indication at the wireless device, e.g., via a user interface, and/or provide a notification message to the provisioning server with an error code to indicate an incompatibility between the wireless device and the eSIM profile downloaded from the provisioning server. In some embodiments, the provisioning server accounts for incompatibility of the previously provided eSIM profile with the wireless device and subsequently provides a compatible eSIM profile to the wireless device after receipt of the notification message indicating the incompatibility. In some embodiments, the wireless device detects an incompatibility of an eSIM profile with the wireless device during an eSIM profile provisioning procedure and prior to downloading a device-incompatible eSIM profile, e.g., based on information included in eSIM profile metadata provided to the wireless device, the eSIM profile metadata indicating a type of eSIM profile assigned for downloading to the wireless device. The wireless device can proactively cancel downloading of the eSIM profile, e.g., by sending to the provisioning server a cancel session message that includes a reason code indicating that the wireless device does not support the eSIM profile, and therefore avoid downloading a device-incompatible eSIM profile. In some embodiments, wireless circuitry of the wireless device, e.g., a baseband processor and/or an eUICC, detects an error condition during an eSIM profile provisioning procedure, e.g., a repeated reset loop for an eSIM profile or an enabled eSIM profile without an initialized USIM application. The wireless circuitry can disable the incompatible eSIM profile, provide a user notification to contact an applicable MNO, and/or provide a notification message to an MNO provisioning server indicating forced disablement of the incompatible eSIM profile by the wireless device.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 2 illustrates a block diagram of a more detailed view of exemplary components of the system of FIG. 1, according to some embodiments.

FIGS. 6A and 6B illustrates diagrams of exemplary device based techniques to mitigate device-incompatible eSIM profile provisioning to a wireless device, according to some embodiments.

DETAILED DESCRIPTION

Figure 1:
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for dynamic feature-dependent electronic subscriber identity module (eSIM) profile provisioning for wireless devices, including provisioning of device-compatible eSIM profiles and mitigation of provisioned device-incompatible eSIM profiles. Wireless devices that support electronically downloadable eSIM profiles are becoming more prevalent, and newer revisions of cellular wireless communication standards provide for optional eSIM profile formats that may not be supported by some wireless devices. Wireless devices that support mandatory features of certain releases of Third Generation Partnership Project (3GPP) wireless communication standards may be not configured to support optional features of the same releases. Present releases include protocols for communication of a limited range of wireless device capabilities between a wireless device and a network node of a cellular wireless network, including, for example, support for and/or compliance with particular release versions of particular radio access technologies (RATs), such as fourth generation (4G) Long Term Evolution (LTE) or fifth generation (5G) new radio (NR) RATs; however, the wireless device's capability to support particular optional features may not be known to the network node or able to be communicated to the network node by the wireless device. Exemplary network nodes include MNO provisioning servers or subscription manager data preparation plus (SM-DP+) servers. Downloading an eSIM profile that uses optional features of a particular release version of a particular RAT to a wireless device compliant with mandatory features but not configured to use the optional features of the eSIM profile can result in significant error conditions, such as periodic boot-up failures, eSIM failures, repeated eSIM reset looping, and/or un-initialization of an application, such as a universal SIM (USIM) application or an Internet Protocol multimedia services identity module (ISIM) application, which in some cases can result in a wireless device with no operational cellular service capability. The wireless device can be unable to disable the incompatible eSIM profile, unable to download another eSIM profile, or send notifications to the network node, as the wireless device can be attempting and failing to initialize and use the incompatible eSIM profile.

During an eSIM profile provisioning procedure, a provisioning server (e.g., SM-DP+) can perform an eligibility check based on reported capabilities of the wireless device. Presently, reported device capabilities do not include critical information regarding optional device capabilities to support optional features of a wireless communication standard, even though compatibility of the wireless device to one or more RATs and release versions may be known. If the provisioning server provides to the wireless device an eSIM profile that uses optional features, such as a non-3GPP application, an elementary file (EF) for a network access identifier, such as a network specific identifier (NSI), a global line identifier (GLI), or a global cable identifier (GCI) configured for use in a standalone non-public network (SNPN) or a non-3GPP network, or lacking a USIM application, wireless circuitry of the wireless device, e.g., a baseband processor and/or an eUICC, can be unable to initialize and use the incompatible eSIM profile. To overcome this deficiency, several different techniques are described herein, including methods based on: i) communication between the wireless device and a provisioning server of optionally supported additional device capabilities, ii) selection of eSIM profiles matched to features supported by a wireless device, iii) detection of incompatible eSIM profiles at a provisioning server and/or at a wireless device, and iv) mitigation of error conditions associated with downloading and/or installation of an incompatible eSIM profile at a wireless device.

In some embodiments, a wireless device provides to a network-based provisioning server information regarding additional device capabilities indicating support (or lack thereof) for one or more optional cellular wireless standard features supplemental to device capabilities indicating support for or compliance with particular standardized release versions of particular cellular wireless radio access technologies (RATs). In some embodiments, the additional device capabilities information indicates whether the wireless device supports one or more of: i) a non-3GPP application, e.g., in place of a universal SIM (USIM) application, ii) a network access identifier (NAI) value, such as a network specific identifier (NSI) value, a global line identifier (GLI) value, or a global cable identifier (GCI) value, instead of an international mobile subscriber identifier (IMSI) value, e.g. for use in a standalone non-public network (SNPN) and/or non-3GPP network, iii) an eSIM without a USIM application, iv) cellular communication without NAI (e.g., NSI, GLI, GCI) support, v) cellular communication with NAI (e.g., NSI, GLI, GCI) support, vi) non-cellular only communication with NAI (e.g., NSI, GLI, GCI) support, vii) basic encoding rule tag/length/value (BER-TLV) formatting for particular parameters or elementary files (EFs), viii) a reduced-capability configuration, (ix) a non-terrestrial network (NTN) capability, (x) a proximity services (ProSe) capability for LTE and/or 5G, or (xi) an Internet of Things (IoT) capability. A network-based provisioning server can use the additional device capabilities information provided by a wireless device to determine compatibility of the wireless device with particular eSIM profiles. In some embodiments, the provisioning server dynamically selects an eSIM profile to download to and install on the wireless device based at least in part on the provided additional device capabilities information. For example, the provisioning server can select an eSIM profile with optional features when the wireless device indicates support for such features or an eSIM profile without optional features when the wireless device indicates such features are not supported. In some embodiments, the provisioning server provides to the wireless device an error indication without providing an eSIM profile when optional features of an eSIM profile to be downloaded to the wireless device are not supported by the wireless device.

In some embodiments, a wireless device detects an error condition during a provisioning procedure for an eSIM profile and implements mitigation techniques to disable the eSIM profile and in some cases re-enable a bootstrap eSIM profile on the wireless device. The wireless device can provide an error indication at the wireless device, e.g., via a user interface, and/or provide a notification message to the provisioning server with an error code to indicate an incompatibility between the wireless device and the eSIM profile downloaded from the provisioning server. In some cases, the wireless device can alert a user to contact an applicable MNO to determine an appropriate eSIM profile for the wireless device. In some embodiments, the provisioning server accounts for incompatibility of a previously reserved and/or provided eSIM profile for the wireless device and subsequently provides a compatible eSIM profile to the wireless device, such as after receipt of a notification message indicating the incompatibility. In some embodiments, the wireless device detects an incompatibility of an eSIM profile with the wireless device during an eSIM profile provisioning procedure and prior to downloading a device-incompatible eSIM profile, e.g., based on information included in eSIM profile metadata provided to the wireless device, the eSIM profile metadata indicating a type of eSIM profile assigned for downloading to the wireless device. The wireless device can proactively cancel downloading of the eSIM profile, e.g., by sending to the provisioning server a cancel session message that includes a reason code indicating that the wireless device does not support the eSIM profile, and therefore avoid downloading a device-incompatible eSIM profile. In some embodiments, wireless circuitry of the wireless device, e.g., a baseband processor and/or an eUICC, detects an error condition during an eSIM profile provisioning procedure, e.g., a repeated reset loop for an eSIM profile or an enabled eSIM profile without an initialized USIM application. The wireless circuitry can disable the incompatible eSIM profile, provide a user notification to contact an applicable MNO, and/or provide a notification message to an MNO provisioning server indicating forced disablement of the incompatible eSIM profile by the wireless device. The MNO provisioning server, in some cases, can note the incompatibility of the eSIM profile (or eSIM profiles of a particular type) with the wireless device (which can be uniquely identified, such as by an eUICC identifier, EID, value, a type allocate code, TAC, value, and/or an international mobile equipment identifier, IMEI, value) and subsequently select and download a compatible eSIM profile to the wireless device, during the same or during another eSIM profile provisioning procedure.

These and other embodiments are discussed below with reference to FIGS. 1-8; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a wireless device 102, which can also be referred to as a device, a mobile wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The wireless device 102 can represent a mobile computing device (e.g., an iPhone® or an iPad® by Apple®) or a cellular-capable wearable device (e.g., an Apple Watch), the base stations 112-1 to 112-n can represent cellular wireless network entities including evolved NodeBs (eNodeBs or eNBs) and/or next generation NodeBs (gNodeBs or gNBs) that are configured to communicate with the wireless device 102, and the MNOs 114 can represent different wireless service providers that provide specific cellular wireless services (e.g., voice and data) to which a user of the wireless device 102 can subscribe, such as via a subscription account, and access using credentials provided by the MNOs 114.

As shown in FIG. 1, the wireless device 102 can include processing circuitry, which can include one or more processor(s) 104 and a memory 106, an embedded Universal Integrated Circuit Card (eUICC) 108, and baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the wireless device 102 includes one or more physical UICCs 118, also referred to as Subscriber Identity Module (SIM) cards, in addition to or substituting for the eUICC 108. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can store multiple electronic SIMs (eSIMs), also referred to as eSIM profiles, which are configured for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different cellular wireless subscriptions with which the wireless device 102 is associated. To be able to access services provided by an MNO 114, an eSIM can be reserved for subsequent download and installation to the eUICC 108. In some embodiments, the eUICC 108 obtains one or more eSIMs from one or more associated provisioning servers 116. The provisioning servers 116 can be maintained by a manufacturer of the wireless device 102, the MNOs 114, third party entities, and the like. Communication of eSIM data between an MNO provisioning server 116 and the eUICC 108 (or between the MNO provisioning server 116 and processing circuitry of the wireless device 102 external to the eUICC 108, e.g., the processor 104) can use a secure communication channel. In some embodiments, at least one limited functionality, bootstrap provisioning eSIM profile is pre-loaded to the eUICC 108 of the wireless device 102 during manufacturing after assembly of the eUICC 108 in the wireless device 102. A fully functional eSIM can be reserved for the wireless device 102 and provided to the eUICC 108 of the wireless device 102, in some embodiments, via a secure data connection established using a bootstrap provisioning eSIM profile pre-loaded on the eUICC 108.

FIG. 2 illustrates a block diagram of a more detailed view 200 of particular components of the wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC

108, e.g., by downloading, installing, deleting, enabling, disabling, modifying, or otherwise performing management of the eSIMs 208 within the UICC 108 and providing baseband wireless circuitry 110 with access to the eSIMs 208 to provide access to wireless services for the wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the wireless device 102 to communicate with an MNO 114 and provide useful features (e.g., phone calls and internet access) to a user of the wireless device 102.

As also shown in FIG. 2, the baseband wireless circuitry 110 of the wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtain information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the wireless device 102 and MNOs 114 according to the different eSIMs 208 that are enabled within the eUICC 108.

Figure 3:
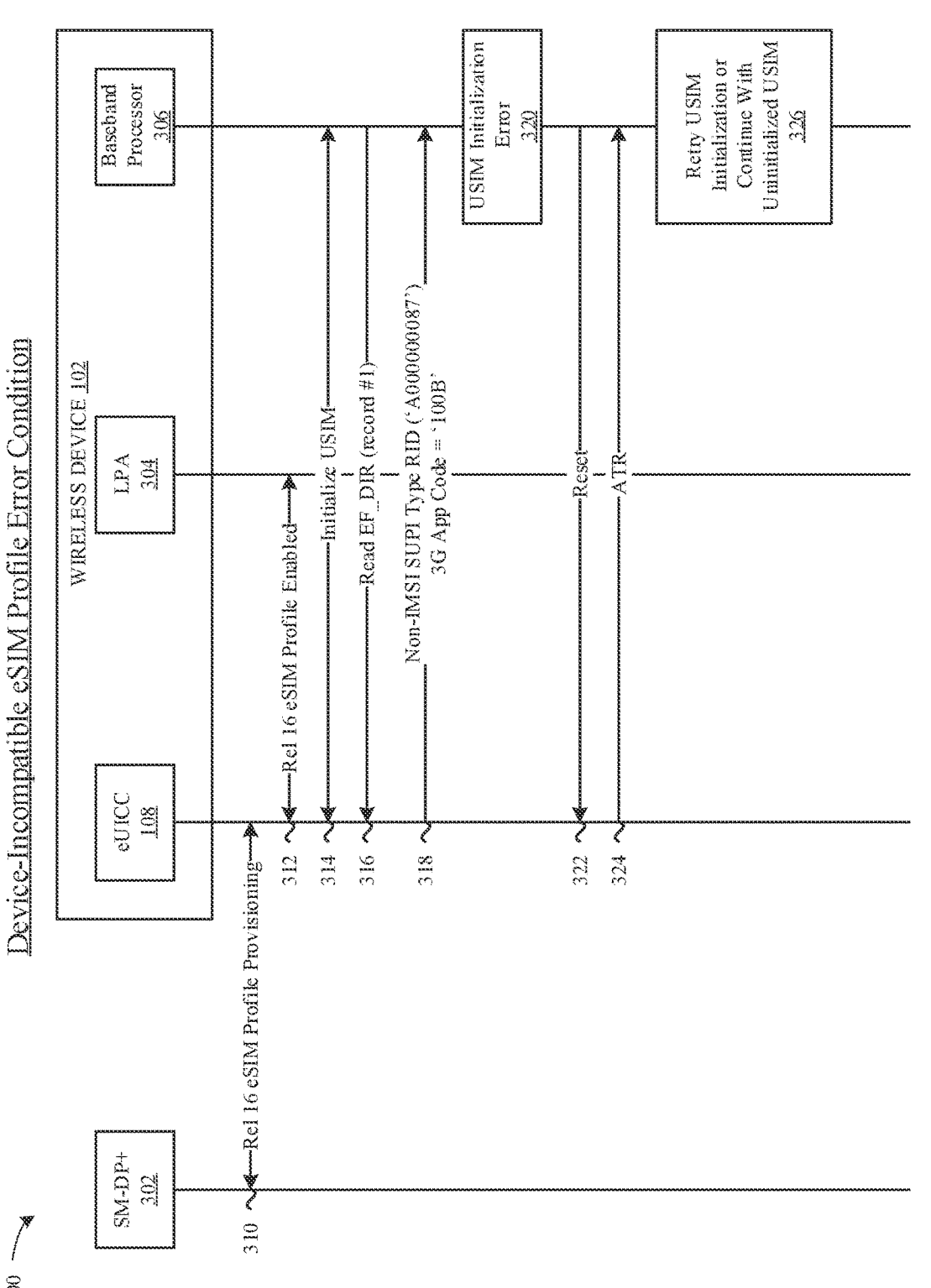
FIG. 3 illustrates a diagram of an exemplary error condition resulting from provisioning a device-incompatible eSIM profile to a wireless device, according to some embodiments.

FIG. 3 illustrates a block diagram 300 of an exemplary error condition resulting from provisioning a device-incompatible eSIM profile 208 to a wireless device 102. Wireless communication standards, such as developed and published by the Third Generation Partnership Project (3GPP) and European Technical Standards Institute (ETSI) standardization bodies, are updated with new release versions that provide added features. Release version 16 (and subsequent releases) include optional device features that may be incompatible with wireless devices 102 that do not support the optional device features. Examples of optional device features include i) support for a network access identifier (NAI) value, such as a network specific identifier (NSI) value, a global line identifier (GLI) value, or a global cable identifier (GCI) value, in place of an international mobile subscriber identifier (IMSI) value and ii) support for a non-IMSI based universal SIM (USIM) application. A wireless device 102 that downloads an eSIM profile that includes one or more optional device features can be unable to initialize the eSIM profile and in some cases can result in error conditions, such as periodic boot-up failure, eSIM failure, repeated SIM resets, and lack of cellular wireless service for the wireless device 102. During present eSIM profile provisioning procedures, a provisioning server 116, such as an SM-DP+ 302, has limited visibility to device specific limitations even though device capabilities information regarding compatibility with specific 3GPP release versions for different radio access technologies (RATs) can be provided by the wireless device 102 to the provisioning server 116. Eligibility checking for compatibility with 3GPP release versions for one or more RATs can be insufficient to determine whether a wireless device 102 is compatible with an eSIM profile 208 that incorporates optional features of a 3GPP release version. When an incompatible eSIM profile 208 is downloaded to and installed on an eUICC 108 of a wireless device 102, the wireless device 102, in some cases can be rendered unusable, such as when the incompatible eSIM profile 208 is unable to be disabled, another compatible eSIM profile 208 is unable to be downloaded and/or enabled, cellular communication is unavailable for providing a notification to the provisioning server 116, and/or the wireless device 102 repeatedly attempts to initialize and use the incompatible eSIM profile 208. FIG. 3 provides an example of such an error condition arising from downloading and installing an incompatible eSIM profile 208 on an eUICC 108 of a wireless device 102.

At 310, the wireless device 102 downloads and installs a release 16 eSIM profile 208 on the eUICC 108 of the wireless device 102. At 312, a local profile assistant (LPA) 304, which can be resident on a processor 104 external to the eUICC 108, enables the release 16 eSIM profile 208. At 314, a baseband processor 306, which can be part of the baseband wireless circuitry 110 of the wireless device 102, initiates initialization of a universal SIM (USIM) application of the release 16 eSIM profile 208. At 316, the baseband processor 306 sends a command to the eUICC 108 to read a first record of a directory elementary file (EF_DIR) of the release 16 eSIM profile 208. The eUICC 108, at 318, responds to the read command with a non-IMSI SUPI type registered application provider identifier (RID) value of 'A000000087' and a 3G application code value of '100B'. The baseband processor 306 of the wireless device 102 may be unable to process these values and can determine, at 320, occurrence of a USIM initialization error. At 322, the baseband processor 306 can send a reset command to the eUICC 108, which can reply, at 324, with an answer to reset (ATR) command. The baseband processor, at 325, can reattempt USIM initialization (which would loop back to the USIM initialization step at 314) or continue with the USIM in an uninitialized state. In either case, without a properly initialization USIM application, the wireless device 102 can be unable to use the release 16 eSIM profile 208, which is incompatible with the wireless device 102. Other examples of optional features that can cause similar error conditions include: i) a non-3GPP application in the eSIM profile 208, ii) an elementary file (EF) for a network access identifier (NAI) configured with a network specific identifier (NSI), global line identifier (GLI), or global cable identifier (GCI) included in the eSIM profile 208 and configured for use in a standalone non-public network (SNPN) or a non-3GPP network, or iii) an eSIM profile 208 lacking a USIM application. Eligibility checking based on reported device capabilities, per present wireless communication standards, can be insufficient to detect an incompatible eSIM profile 208.

Figure 4:
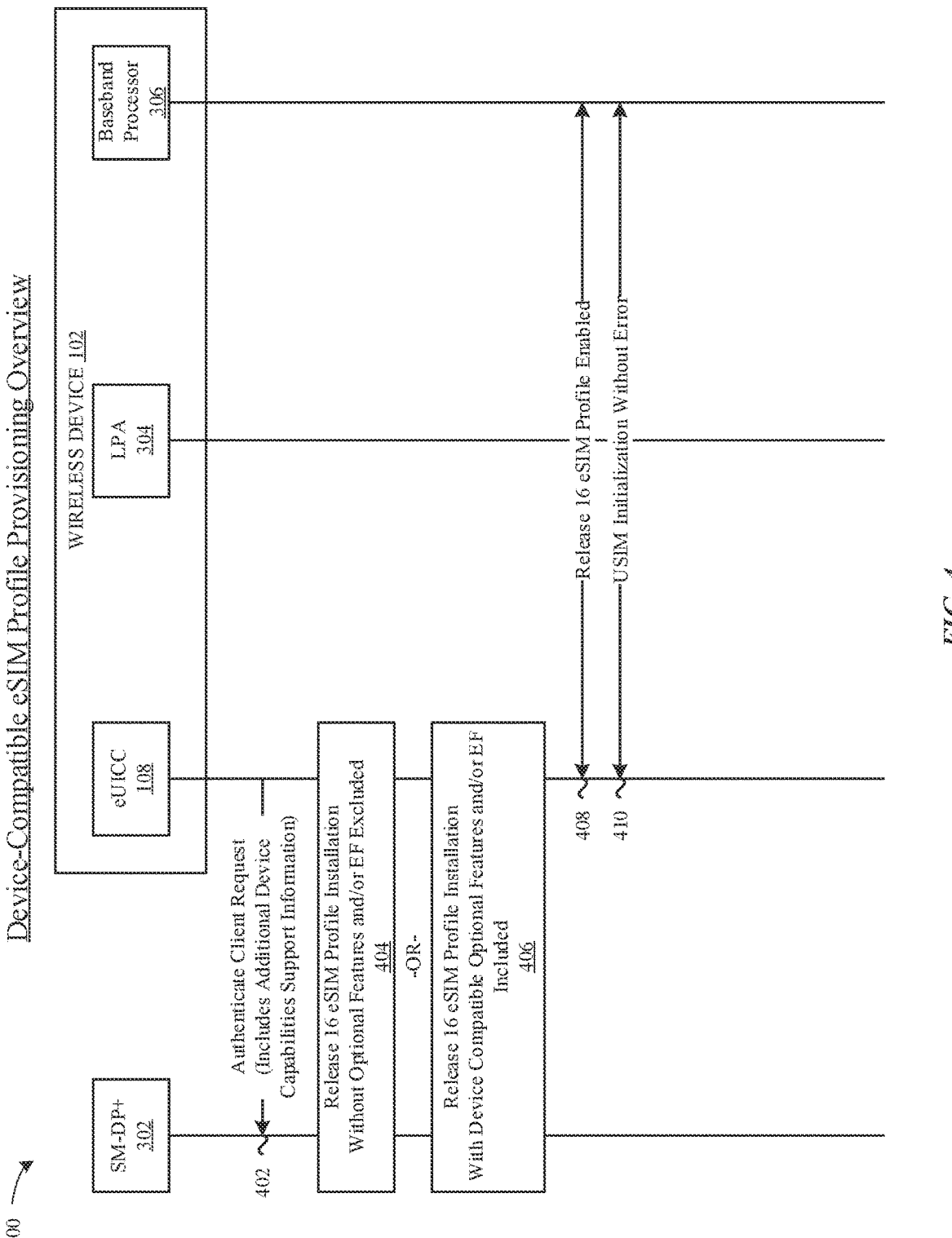
FIG. 4 illustrates a diagram providing an overview of exemplary device-compatible eSIM profile provisioning to a wireless device, according to some embodiments.

FIG. 4 illustrates a diagram 400 providing an overview of exemplary device-compatible eSIM profile 208 provisioning to a wireless device 102. At 402, the eUICC 108 provides to the SM-DP+ 302, additional device capabilities information in an authenticate client request message, the additional device capabilities information indicating whether the wireless device 102 supports one or more optional features of a wireless communication standard. The additional device capabilities information can be supplemental to device capabilities information provided to indicate support for particular 3GPP release versions of different RATs. In some embodiments, the additional device capabilities information is included in a device information field as part of parameters provided in the authenticate client request message to the SM-DP+ 302 by the wireless device 102. In some embodiments, the additional device capabilities information is formatted as a number of bits, each bit indicating support (or lack thereof) for a particular optional feature, or more generally, indicating a capability of the wireless device 102 that includes support (or lack thereof) for an optional feature of a wireless communication standard. For example, a first bit of the additional device capabilities information can indicate whether the wireless device 102 is a cellular device that supports use of a non-IMSI value as a network access identifier (NAI) value, such as network specific identifier (NSI) value, a global line identifier (GLI) value, or a global cable identifier (GCI) value, and a second bit of the additional device capabilities information can indicate whether the wireless device 102 is a non-cellular only wireless device that requires use of non-IMSI NAI value. In some embodiments, the additional device capabilities information include one or more bits to indicate support (or lack thereof) for one or more of: i) a non-3GPP application, e.g., in place of a universal SIM (USIM) application, ii) a network access identifier (NAI) value instead of an international mobile subscriber identifier (IMSI) value, e.g. a network specific identifier (NSI) value, a global line identifier (GLI) value, or a global cable identifier (GCI) value for use in a standalone non-public network (SNPN) and/or non-3GPP network, iii) an cSIM without a USIM application, iv) cellular communication without NAI (e.g., NSI, GLI, and/or GCI) support, v) cellular communication with NAI (e.g., NSI, GLI, and/or GCI) support, vi) non-cellular only communication with NAI (e.g., NSI, GLI, and/or GCI) support, vii) basic encoding rule tag/length/value (BER-TLV) formatting for particular parameters or elementary files (EFs), or viii) a reduced-capability configuration. A reduced-capability wireless device 102 can refer to a wireless device that does not require and/or support a fully loaded 3GPP cSIM profile 208 and can allow for provisioning an eSIM profile 208 with a reduced set of elementary files (EFs), e.g., mandatory EFs only, and/or applets, e.g., fewer and/or reduced-functionality applets. Other additional device capabilities can include specialized wireless devices, e.g., Internet of Things (IoT) devices, satellite communication devices, or wireless devices that require specialized (or additional) master files to operate.

Based on the additional device capabilities information provided by the wireless device 102, the SM-DP+ 302, can provide a device-compatible eSIM profile 208 tailored to the wireless device 102. At 404, the SM-DP+ 302 provisions a release 16 eSIM profile 208 for installation on the eUICC 108 of the wireless device 102 without optional features and/or optional elementary files (EFs) of a release 16 wireless communication standard, when the wireless device 102 does not support use of the optional features. Alternatively, at 406, the SM-DP+ 302 provisions a release 16 eSIM profile 208 for installation on the eUICC 108 of the wireless device 102 with optional features and/or optional EFs included of the release 16 wireless communication standard, when the wireless device 102 supports use of the optional features. At 408, the baseband processor 306 and eUICC 108 enable the installed release 16 eSIM profile 208. At 410, initialization of a USIM application in the release 16 eSIM profile 208 occurs without error, as a device-compatible eSIM profile 208 was provisioned to the wireless device 102.

Figure 5A:
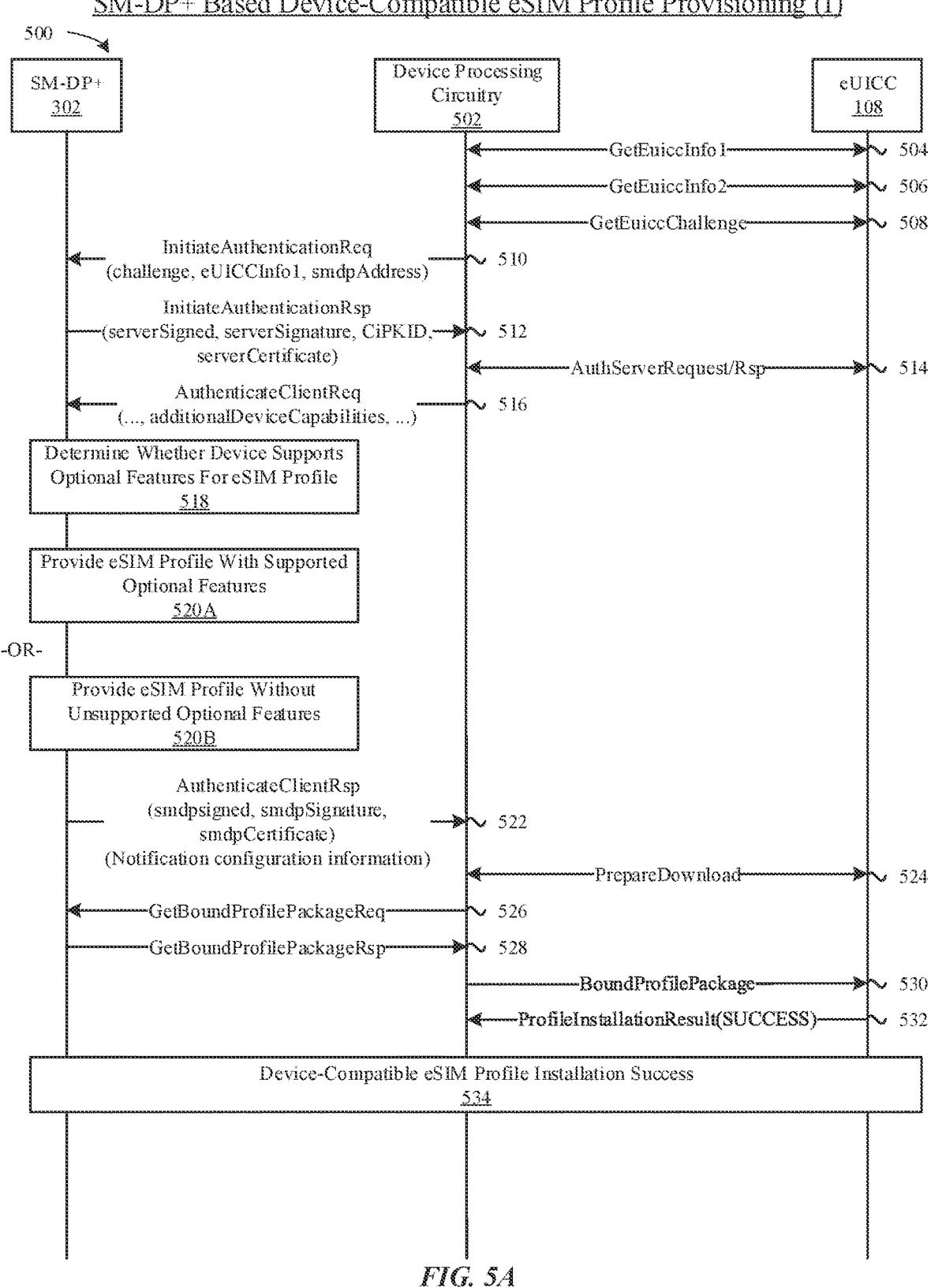
FIGS. 5A and 5B illustrate diagrams of exemplary SM-DP+ based device-compatible eSIM profile provisioning to a wireless device, according to some embodiments.

FIG. 5A illustrates a diagram 500 of an exemplary device-compatible eSIM profile 208 provisioning to a wireless device 102 performed by an MNO provisioning server 116, e.g., an SM-DP+ 302. Device processing circuitry 502 of the wireless device 102, external to an eUICC 108 of the wireless device 102, obtains eUICC information from the eUICC 108, e.g., eUICCInfo1 at 504, eUICCInfo2 at 506, and an eUICC challenge at 508. At 510, the device processing circuitry 502 sends an initiate authentication request message to the SM-DP+ 302, the initiate authentication request message including the eUICC challenge, the eUIC-CInfo1, and a network address of the SM-DP+ 302. At 512, the SM-DP+ 302 replies to the initiate authentication request message from the wireless device 102 with an initiate authentication response message including server-based information. At 514, the device processing circuitry 502 communicates with the eUICC 108 to authenticate the SM-DP+ 302. At 516, the device processing circuitry 502 of the wireless device 102 sends an authenticate client request message to the SM-DP+ 032, where the authenticate client request message includes additional device capabilities information to indicate support for (or lack of support for) one or more optional device features as discussed herein. The authenticate client request message also includes other information (not shown) used for authentication of the eUICC 108 of the wireless device 102 by the SM-DP+ 302. The authenticate client request message further includes device capabilities information to indicate support for release versions of particular radio access technologies (RATs), where the device capabilities information is separate from the additional device capabilities information provided for optional device features. In some embodiments, the additional device capabilities information is merged with device capabilities information in the authenticate client request message. At 518, the SM-DP+ 302 determines whether the wireless device 102 supports one or more optional features for an eSIM profile 208. The SM-DP+ 302 can select an applicable eSIM profile 208 to provide to the wireless device 102 based at least in part on the additional device capabilities information provided in the authenticate client request message. When the wireless device 102 supports optional device features, as indicated by the additional device capabilities information, the SM-DP+ 302, at 520A, provides an eSIM profile 208 that includes one or more supported optional features. When the wireless device 102 does not support optional device features, as indicated by the additional device capabilities information, the SM-DP+ 302, at 520B, provides an eSIM profile 208 without including unsupported optional features. At 522, the SM-DP+ 302 replies to the authenticate client request message with an authenticate client response message. In some embodiments, the authenticate client response message includes a notification regarding configuration information of the eSIM profile selected for provisioning to the wireless device 102. At 524, the eUICC 108 and device processing circuitry 502 of the wireless device 102 prepare for download and installation of the eSIM profile 208 from the SM-DP+ 302. At 526, the device processing circuitry sends a get bound profile package (BPP) request message to the SM-DP+ 302, which replies, at 528, with a get bound profile package response message that includes a BPP that includes the eSIM profile 208 selected for the wireless device 102 based on the previously provided additional device capabilities information. The device processing circuitry 502 transfers the BPP to the eUICC 108 at 530, and the eUICC 108, at 532, provides a message to the device processing circuitry 502 indicating successful installation of the eSIM profile 208 on the eUICC 108. At 534, the selected device-compatible eSIM profile 208 has been successfully installed on the eUICC 108 of the wireless device 102.

Figure 5B:
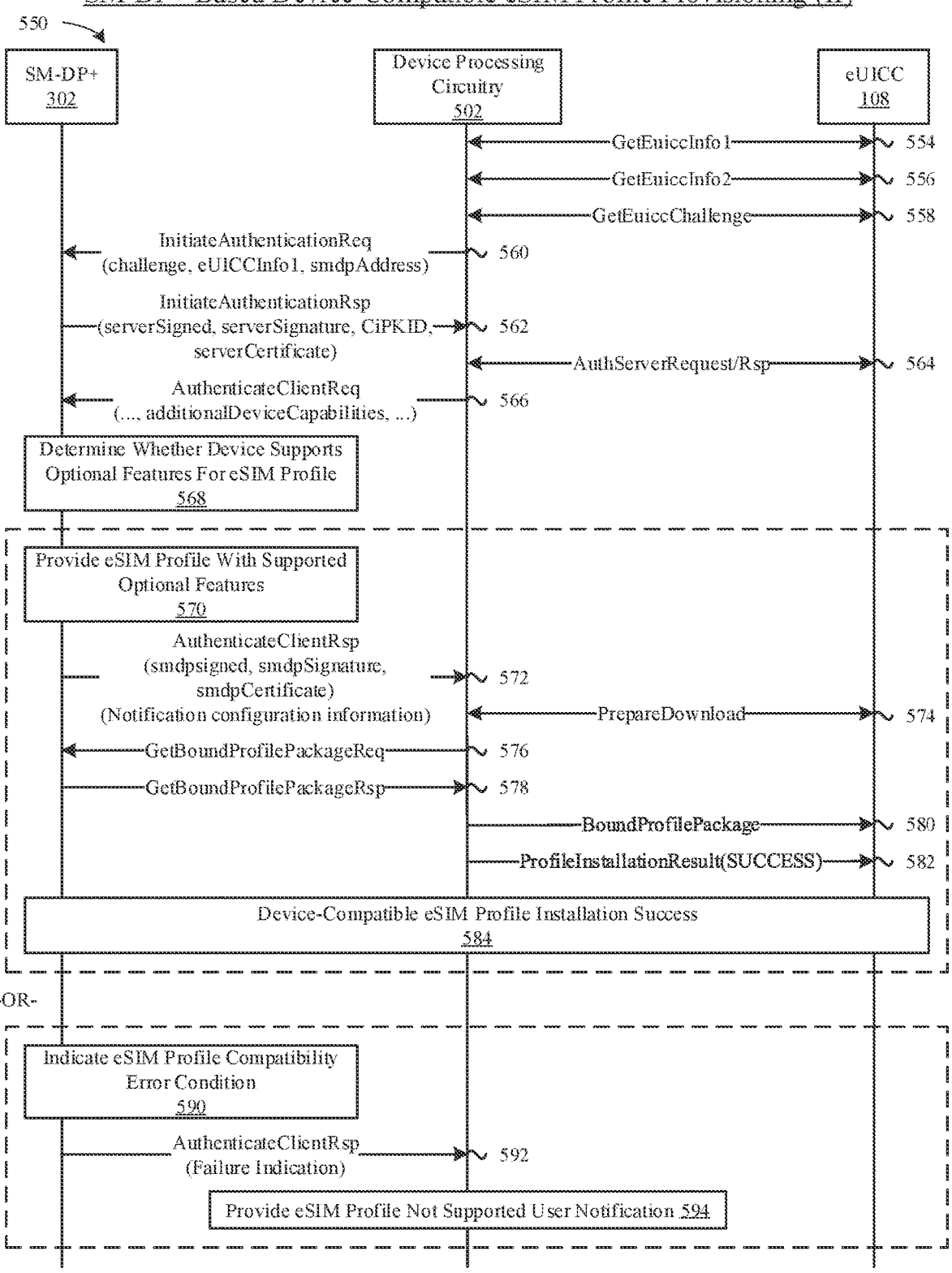

FIG. 5B illustrates a diagram 550 of another exemplary device-compatible eSIM profile 208 provisioning to a wireless device 102 performed by an MNO provisioning server 116. e.g., an SM-DP+ 302. Device processing circuitry 502 of the wireless device 102, external to an eUICC 108 of the wireless device 102, obtains eUICC information from the eUICC 108, e.g., eUICCInfo1 at 554, eUICCInfo2 at 556, and an eUICC challenge at 558. At 560, the device processing circuitry 502 sends an initiate authentication request message to the SM-DP+ 302, the initiate authentication request message including the eUICC challenge, the eUIC-CInfo1, and a network address of the SM-DP+ 302. At 562, the SM-DP+ 302 replies to the initiate authentication request message from the wireless device 102 with an initiate authentication response message including server-based information. At 564, the device processing circuitry 502 communicates with the eUICC 108 to authenticate the SM-DP+ 302. At 566, the device processing circuitry 502 of the wireless device 102 sends an authenticate client request message to the SM-DP+ 032, where the authenticate client request message includes additional device capabilities information to indicate support for (or lack of support for) one or more optional device features as discussed herein. The authenticate client request message also includes other information (not shown) used for authentication of the eUICC 108 of the wireless device 102 by the SM-DP+ 302. The authenticate client request message further includes device capabilities information to indicate support for release versions of particular RATs, where the device capabilities information is separate from the additional device capabilities information provided for optional device features. In some embodiments, the additional device capabilities information is merged with the device capabilities information in the authenticate client request message. At 568, the SM-DP+ 302 determines whether the wireless device 102 supports one or more optional features for an eSIM profile 208. At 570, when the wireless device 102 supports optional device features included in an cSIM profile 208 reserved for the wireless device 102, the SM-DP+ 302 provides a device-compatible eSIM profile 208 to the wireless device 102 based at least in part on the additional device capabilities information provided in the authenticate client request message. At 572, the SM-DP+ 302 replies to the authenticate client request message with an authenticate client response message. In some embodiments, the authenticate client response message includes a notification regarding configuration information of the eSIM profile selected for provisioning to the wireless device 102. At 574, the eUICC 108 and device processing circuitry 502 of the wireless device 102 prepare for download and installation of the eSIM profile 208 from the SM-DP+ 302. At 576, the device processing circuitry sends a get bound profile package (BPP) request message to the SM-DP+ 302, which replies, at 578, with a get bound profile package response message that includes a BPP that includes the eSIM profile 208 for the wireless device 102. The device processing circuitry 502 transfers the BPP to the eUICC 108 at 580, and the eUICC 108, at 582, provides a message to the device processing circuitry 502 indicating successful installation of the eSIM profile 208 on the eUICC 108. At 584, the selected device-compatible eSIM profile 208 has been successfully installed on the eUICC 108 of the wireless device 102.

When the wireless device 102 does not support optional device features of a reserved eSIM profile 208, the SM-DP+ 302, at 590, indicates an eSIM profile 208 compatibility error condition has occurred. At 592, the SM-DP+ 302 sends an authenticate client response message that includes a failure indication to indicate that the eSIM profile 208 requested by the wireless device 102 cannot be provisioned to the wireless device 102. At 594, the device processing circuitry 502 of the wireless device 102 provides a user notification, e.g., via a user interface of the wireless device 102, to indicate that the eSIM profile 208 requested for provisioning to the wireless device 102 is not supported by (or compatible with a configuration of) the wireless device 102. In some embodiments, the user notification can direct a user of the wireless device 102 to contact an MNO 114 from which the device-incompatible eSIM profile 208 originated to determine next steps for obtaining a device-compatible eSIM profile 208 for the wireless device 102.

FIG. 6A illustrates a diagram 600 of an exemplary device-based technique to mitigate device-incompatible eSIM profile 208 provisioning to a wireless device 102. At 602, a device-incompatible eSIM profile 208 is downloaded to and installed on an eUICC 108 of the wireless device 102. At 604, the device processing circuitry 502 and eUICC 108 perform a card reset procedure with successful activation of the eUICC 108. At 606, the device processing circuitry 502 and the eUICC 108 begin an initialization procedure for a USIM application of the device-incompatible eSIM profile 208. At 608, the device processing circuitry 502 sends a command to the eUICC 108 to read a first record of a directory elementary file (EF_DIR) of the device-incompatible eSIM profile 208. At 610, the eUICC 108 returns to the device processing circuitry 502 a non-IMSI SUPI type RID value, e.g., 'A000000087', and at 612, the device processing circuitry 502 detects an error condition based on the non-IMSI SUPI type RID value previously received and/or based on a 3G application code having a value, e.g., '100B', indicating that the eSIM profile 208 being initialized is incompatible with the wireless device 102. At 614, the device processing circuitry 502 and the eUICC 108 initiate a device recovery procedure. At 616, the device processing circuitry 502 and the eUICC 108 disable the device-incompatible eSIM profile 208. In some embodiments, when a limited-functionality bootstrap eSIM profile 208 is available on the eUICC 108 (and, in some cases, when no fully functional eSIM profiles 208 are enabled on the eUICC 108), the device processing circuitry 502 and the eUICC 108 enable the limited-functionality bootstrap cSIM profile 208 to provide a limited capability cellular connection for the wireless device 102, e.g., to communicate with the SM-DP+ 302 and/or to contact an MNO 114. At 620, the device processing circuitry 502 provides a user notification, e.g., via a user interface of the wireless device 102, to indicate that the eSIM profile 208 requested for provisioning to the wireless device 102 is not supported by (or compatible with a configuration of) the wireless device 102. In some embodiments, the user notification can direct a user of the wireless device 102 to contact an MNO 114 from which the device-incompatible eSIM profile 208 originated to determine next steps for obtaining a device-compatible eSIM profile 208 for the wireless device 102. At 622, the device processing circuitry 502 (or the eUICC 108) sends to the SM-DP+ 302 a notification message indicating that the downloaded and installed eSIM profile 208 is incompatible with the wireless device 102. In some embodiments, the notification message includes a specific error code (reason code) indicating incompatibility of the eSIM profile 208. At 624, the SM-DP+ 302 determines that the wireless device 102 does not support optional features of the previously provided eSIM profile 208. In some embodiments, the SM-DP+ 302 notes the device incompatibility for the wireless device 102, which can be uniquely identified by a hardware identifier, such as an eUICC identifier (EID) value, a type allocation code (TAC) value, and/or an international mobile equipment identifier (IMEI) value. In some embodiments, at 626, the SM-DP+ provides to the wireless device 102 a device-compatible eSIM profile 208 that does not include the unsupported optional features, and at 628, the wireless device 102 downloads and installs the provided device-compatible eSIM profile 208 to the eUICC 108 of the wireless device 102.

FIG. 6B illustrates another exemplary device-based technique to mitigate device-incompatible eSIM profile 208 provisioning to a wireless device 102. In the technique illustrated in FIG. 6A, the wireless device 102 detects incompatibility of the eSIM profile 208 after downloading, installing, and attempting to initialize the device-incompatible eSIM-profile 208, while in the technique illustrated in FIG. 6B, the wireless device 102 determines incompatibility of the eSIM profile 208 during the provisioning process before downloading the device-incompatible eSIM profile 208. Device processing circuitry 502 of the wireless device 102, external to an eUICC 108 of the wireless device 102, obtains eUICC information from the eUICC 108, e.g., eUICCInfo1 at 652, eUICCInfo2 at 654, and an UICC challenge at 656. At 660, the device processing circuitry 502 sends an initiate authentication request message to the SM-DP+ 302, the initiate authentication request message including the eUICC challenge, the eUICCInfo1, and a network address of the SM-DP+ 302. At 662, the SM-DP+ 302 replies to the initiate authentication request message from the wireless device 102 with an initiate authentication response message including server-based information. At 664, the device processing circuitry 502 communicates with the eUICC 108 to authenticate the SM-DP+ 302. At 666, the device processing circuitry 502 of the wireless device 102 sends an authenticate client request message to the SM-DP+ 032, where the authenticate client request message includes additional device capabilities information to indicate support for (or lack of support for) one or more optional device features as discussed herein. The authenticate client request message also includes other information (not shown) used for authentication of the eUICC 108 of the wireless device 102 by the SM-DP+ 302. The authenticate client request message further includes device capabilities information to indicate support for release versions of particular RATs, where the device capabilities information is separate from the additional device capabilities information provided for optional device features. At 668, the SM-DP+ 302 replies to the authenticate client request message with an authenticate client response message. The authenticate client response message includes information regarding an cSIM profile 208 reserved for provisioning to the wireless device 102, such as a profile type indicator, and a private network identifier value. In some embodiments, the private network identifier value is a network access identifier (NAI) value that does not correspond to an IMSI value, e.g., a network specific identifier (NSI) value, a global line identifier (GLI) value, or a global cable identifier (GCI) value, and can indicate that the eSIM profile 208 is intended for use on a private (non-public) wireless network or a non-3GPP wireless network. At 670, the device processing circuitry 502 of the wireless device 102 determines, based at least in part on the eSIM profile 208 information provided by the SM-DP+ 302 in the authenticate client response message, that the eSIM profile 208 reserved for the wireless device 102 is incompatible with the wireless device 102. At 672, the device processing circuitry 502 of the wireless device 102 provides a user notification, e.g., via a user interface of the wireless device 102, to indicate that the eSIM profile 208 requested for provisioning to the wireless device 102 is not supported by (or compatible with a configuration of) the wireless device 102. In some embodiments, the user notification can direct a user of the wireless device 102 to contact an MNO 114 from which the device-incompatible eSIM profile 208 originated to determine next steps for obtaining a device-compatible eSIM profile 208 for the wireless device 102. At 674, the device processing circuitry 502 of the wireless device 102 sends to the SM-DP+ 302 a cancel session message that includes an error code (reason code) indicating incompatibility of the eSIM profile 208, previously reserved for the wireless device 102, with a configuration of the wireless device 102. At 676, the eSIM profile 208 provisioning, download, and installation procedure is canceled between the wireless device 102 and the SM-DP+ 302. In some embodiments, at 678, the SM-DP+ 302 determines that the wireless device 102 does not support optional features of the reserved eSIM profile 208. In some embodiments, the SM-DP+ 302 notes the device incompatibility for the wireless device 102, which can be uniquely identified by a hardware identifier, such as an eUICC identifier (EID) value, a type allocation code (TAC) value, and/or an international mobile equipment identifier (IMEI) value. In some embodiments, at 680, the SM-DP+ provides to the wireless device 102 a device-compatible eSIM profile 208 that does not include the unsupported optional features, and at 682, the wireless device 102 downloads and installs the provided device-compatible eSIM profile 208 to the eUICC 108 of the wireless device 102

Figure 7:
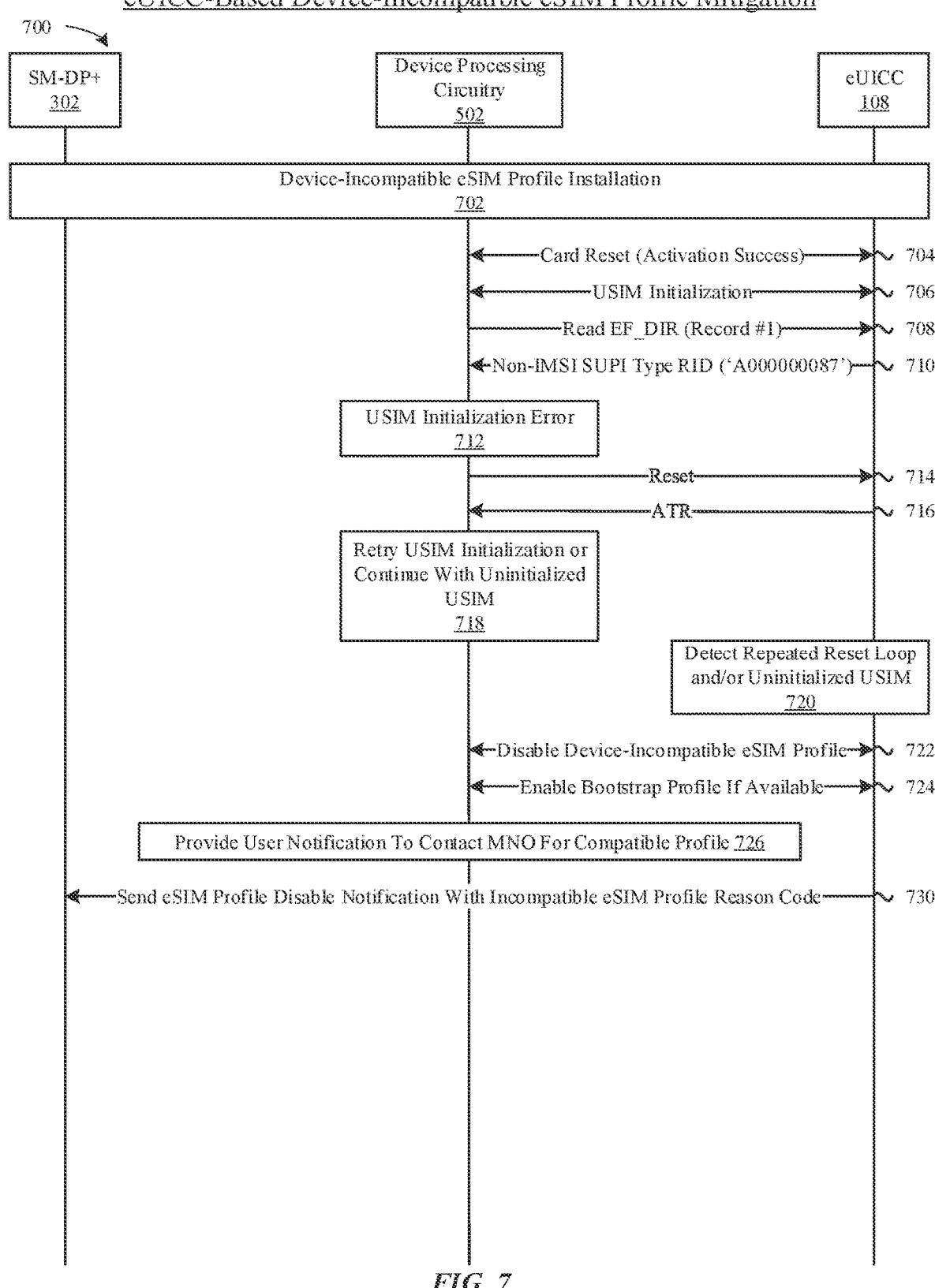
FIG. 7 illustrates a diagram of an exemplary eUICC based technique to mitigate device-incompatible eSIM profile provisioning to a wireless device, according to some embodiments.

FIG. 7 illustrates an eUICC-based technique to mitigate provisioning of a device-incompatible eSIM profile 208 to a wireless device 102. In the technique illustrated in FIG. 7, the wireless device 102 detects an error condition resulting from attempting to initialize and use a device-incompatible eSIM profile 208 and performs actions to mitigate the error condition. At 702, a device-incompatible eSIM profile 208 is downloaded to and installed on an eUICC 108 of the wireless device 102. At 704, the device processing circuitry 502 and eUICC 108 perform a card reset procedure with successful activation of the eUICC 108. At 706, the device processing circuitry 502 and the eUICC 108 begin an initialization procedure for a USIM application of the device-incompatible cSIM profile 208. At 708, the device processing circuitry 502 sends a command to the eUICC 108 to read a first record of a directory elementary file (EF_DIR) of the device-incompatible eSIM profile 208. At 710, the eUICC 108 returns to the device processing circuitry 502 a non-IMSI SUPI type RID value, e.g., 'A000000087'. At 712, the device processing circuitry 502 of the wireless device determines a USIM initialization error has occurred, e.g., based on receipt of the non-IMSI SUPI type RID value, which can be an unrecognized value or a value which the device processing circuitry 502 is not configured to process. At 714, the device processing circuitry 502 sends to the eUICC 108 a reset command, and at 716, the eUICC 108 replies with an answer to reset (ATR) command. At 718, the device processing circuitry 502 can retry the USIM initialization procedure (e.g., by looping back to the USIM initialization step at 706), or the device processing circuitry 502 can continue with an uninitialized USIM application. In either case, without a properly initialized USIM application, the wireless device 102 can be unable to use the device-incompatible eSIM profile 208. At 720, the eUICC 108 can detected a repeated reset loop, when one or more retries of the USIM initialization procedure occurs, or the eUICC 108 can determine that the USIM application is uninitialized, i.e., the USIM initialization procedure has not completed successfully, and that the eSIM profile 208 is incompatible with the wireless device 102. At 722, the eUICC 108 can take action to stop the multiple resets and disable use of the device-incompatible eSIM profile 208. At 724, in some embodiments, when a limited-functionality bootstrap eSIM profile 208 is available on the eUICC 108 (and, in some cases, when no fully functional eSIM profiles 208 are enabled on the eUICC 108), the device processing circuitry 502 and the eUICC 108 enable the limited-functionality bootstrap eSIM profile 208 to provide a limited capability cellular connection for the wireless device 102, e.g., to communicate with the SM-DP+ 302 and/or to contact an MNO 114. At 726, the device processing circuitry 502 provides a user notification, e.g., via a user interface of the wireless device 102, to indicate that the eSIM profile 208 requested for provisioning to the wireless device 102 is not supported by (or compatible with a configuration of) the wireless device 102. In some embodiments, the user notification can direct a user of the wireless device 102 to contact an MNO 114 from which the device-incompatible eSIM profile 208 originated to determine next steps for obtaining a device-compatible eSIM profile 208 for the wireless device 102. At 730, the device processing circuitry 502 (or the eUICC 108) sends to the SM-DP+ 302 a notification message indicating that the downloaded and installed eSIM profile 208 is incompatible with the wireless device 102. In some embodiments, the notification message includes a specific error code (reason code) indicating incompatibility of the eSIM profile 208. The SM-DP+ 302 can determine, based on error/reason code in the notification message, that the wireless device 102 does not support optional features of the previously provided eSIM profile 208. In some embodiments, the SM-DP+ 302 notes the device incompatibility for the wireless device 102, which can be uniquely identified by a hardware identifier, such as an eUICC identifier (EID) value, a type allocation code (TAC) value, and/or an international mobile equipment identifier (IMEI) value, and uses that information about device incompatibility when providing additional eSIM profiles 208 to the wireless device 102.

Representative Embodiments

In some embodiments, a method for device-compatible electronic subscriber identity module (eSIM) profile 208 provisioning to a wireless device 102 by a provisioning server 116 includes: i) receiving, from a wireless device 102, a request message including an indication of additional device capabilities to support one or more optional features of a wireless communication standard; ii) determining whether an eSIM profile 208 corresponding to the indication of additional device capabilities is available for provisioning to the wireless device 102; and iii) sending, to the wireless device 102, the eSIM profile 208 when available, where the indication of additional device capabilities are separate from device capabilities included in the request message indicating support for release versions of one or more radio access technologies (RATs). In some embodiments, the indication of additional device capabilities are included in the request message with (or as an expanded version of) the device capabilities indicating support for release versions of one or more RATs. In some embodiments, the device capabilities and the additional device capabilities are separate fields of a message communicated by the wireless device 102 to the provisioning server 116. In some embodiments, the device capabilities and the additional device capabilities are merged into a single field of a message communicated by the wireless device 102 to the provisioning server 116. In some embodiments, the indication of additional device capabilities includes an indication of a cellular wireless device 102 without support for a network access identifier (NAI) including a network specific identifier (NSI), a global line identifier (GLI), or a global cable identifier (GCI), and the eSIM profile 208 includes a subscription permanent identifier (SUPI) including an international mobile subscriber identifier (IMSI) value. In some embodiments, the indication of additional device capabilities includes an indication of a cellular wireless device 102 with support for an NAI including an NSI, a GLI, or a GCI, and the eSIM profile 208 includes a SUPI including a non-IMSI value, and the eSIM profile 208 includes a SUPI including a non-IMSI value. In some embodiments, the indication of additional device capabilities includes an indication of a non-cellular wireless device 102 with support for an NAI including an NSI, a GLI, or a GCI, and the eSIM profile 208 includes a SUPI including a non-IMSI value. In some embodiments, the indication of additional device capabilities includes an indication of support for an NAI comprising an NSI, a GLI, or a GCI, and the eSIM profile 208 includes a non-IMSI application and excludes a cellular universal SIM (USIM) application. In some embodiments, the indication of additional device capabilities includes an indication of a reduced-capability wireless device 102, an Internet of Things (IoT) wireless device 102, or a non-terrestrial networks (NTN) satellite-capable wireless device 102, and the eSIM profile 208 includes a reduced set of or additionally required elementary files (EFs) and applets. In some embodiments, the method further includes the provisioning server 116 sending, to the wireless device 102, a reply message including a provisioning failure indication, when no eSIM profile 208 corresponding to the indication of additional device capabilities is available for provisioning to the wireless device 102.

In some embodiments, a method for device-incompatible eSIM profile 208 provisioning error mitigation performed by a wireless device 102 includes: i) downloading, from a provisioning server 116, a device-incompatible eSIM profile 208; ii) installing, on an embedded universal integrated circuit card (eUICC) 108 of the wireless device 102, the device-incompatible cSIM profile 208; iii) detecting an error condition during initialization of the device-incompatible eSIM profile 208; iv) disabling the device-incompatible eSIM profile 208; and v) sending, to the provisioning server 116, a notification message indicating incompatibility of the device-incompatible eSIM profile 208. In some embodiments, the method further includes the wireless device 102 enabling a bootstrap eSIM profile 208 on the eUICC 108 of the wireless device 102, after disabling the device-incompatible eSIM profile 208, when no device-compatible eSIM profile 208 is enabled on the eUICC 108. In some embodiments, the method further includes the wireless device 102 providing, via a user interface of the wireless device 102, a user notification indicating incompatibility of the device-incompatible eSIM profile 208 provisioned to the wireless device 102. In some embodiments, the device-incompatible eSIM profile 208 includes a SUPI including a non-IMSI value. In some embodiments, the device-incompatible eSIM profile 208 includes a non-third generation partnership project (non-3GPP) application and excludes a cellular wireless universal SIM (USIM) application. In some embodiments, the detected error condition includes determining the device-incompatible eSIM profile 208 includes a 3GPP application code having a '100B' value. In some embodiments, the method performed by the wireless device 102 further includes: downloading, from the provisioning server 116 after sending the notification message indicating incompatibility of the device-incompatible eSIM profile 208, a device-compatible eSIM profile 208; and installing the device-compatible eSIM profile 208 on the eUICC 108 of the wireless device 102.

In some embodiments, a method for device-incompatible eSIM profile 208 provisioning error mitigation performed by a wireless device 102 includes: i) sending, to a provisioning server 116, a request message including an indication of additional device capabilities to support one or more optional features of a wireless communication standard; ii) receiving, from the provisioning server 116, a response message indicating an eSIM profile 208 reserved for the wireless device 102 requires support of at least one of the one or more optional features of the wireless communication standard; iii) determining the eSIM profile 208 reserved for the wireless device 102 is incompatible with the wireless device 102; and iv) sending, to the provisioning server 116, a notification message canceling provisioning of the eSIM profile 208 to the wireless device 102. In some embodiments, the indication of additional device capabilities are separate from device capabilities included in the request message indicating support for release versions of one or more radio access technologies (RATs). In some embodiments, the indication of additional device capabilities are included in the request message with (or as an expanded version of) the device capabilities indicating support for release versions of one or more RATs. In some embodiments, the device capabilities and the additional device capabilities are separate fields of the request message communicated by the wireless device 102 to the provisioning server 116. In some embodiments, the device capabilities and the additional device capabilities are merged into a single field of the request message communicated by the wireless device 102 to the provisioning server 116. In some embodiments, the response message includes an indication that the eSIM profile 208 includes a private network identifier. In some embodiments, the response message includes an indication that the eSIM profile 208 includes a non-IMSI SUPI value. In some embodiments, the response message includes an indication that the eSIM profile 208 includes a reduced set of elementary files (EFs) and applets compatible with a reduced-capability wireless device 102. In some embodiments, wherein the response message includes an indication that the eSIM profile 208 includes a non-IMSI application and excludes a cellular universal SIM (USIM) application.

Representative Computing Device

Figure 8:
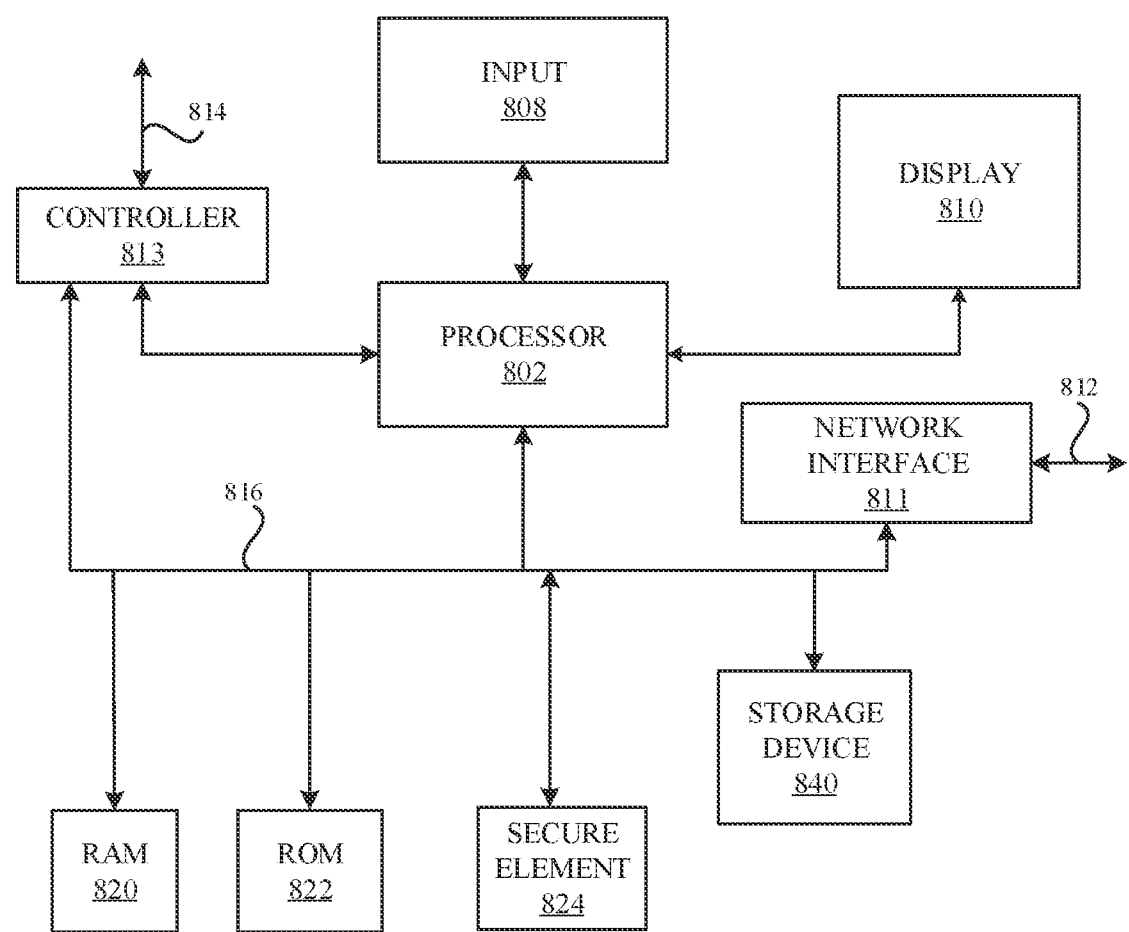
FIG. 8 illustrates a block diagram of exemplary elements of a mobile wireless device, according to some embodiments.

FIG. 8 illustrates a detailed view of a representative computing device 800 that can be used to implement various methods described herein, according to some embodiments. In particular, the detailed view illustrates various components that can be included in the wireless device 102. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 that can be controlled by the processor 802 to display information to the user. A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that communicatively couples to a data link 812. In the case of a wireless connection, the network/bus interface 811 can include a wireless transceiver.

The computing device 800 also includes a storage device 840, which can comprise a single disk or a plurality of disks (e.g., hard drives), and includes a storage management module that manages one or more partitions within the storage device 840. In some embodiments, storage device 840 can include flash memory, semiconductor (solid state) memory or the like. The computing device 800 can also include a Random Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800. The computing device 800 further includes a secure element 824, which can include an eUICC 108 on which to store one or more eSIM profiles 208. In some embodiments, the wireless device 102 also includes a UICC 118 (physical SIM card).

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for device-incompatible electronic Subscriber Identity Module (eSIM) profile provisioning error mitigation, the method comprising:

by a wireless device:

downloading, from a provisioning server, a device-incompatible eSIM profile;

installing, on an embedded universal integrated circuit card (eUICC) of the wireless device, the device-incompatible eSIM profile;

detecting an error condition during initialization of the device-incompatible eSIM profile installed on the eUICC;

disabling the device-incompatible eSIM profile;

sending, to the provisioning server, a notification message indicating incompatibility of the device-incompatible eSIM profile; and providing, via a user interface of the wireless device, a user notification indicating the incompatibility of the device-incompatible eSIM profile provisioned to the wireless device and directing a user of the wireless device to contact a mobile network operator (MNO) from which the device-incompatible eSIM profile originated to determine next steps to obtain a device-compatible eSIM profile, wherein the device-incompatible eSIM profile includes one or more optional features of a wireless communication standard unsupported by the wireless device.

2. The method of claim 1, further comprising:

by the wireless device:

enabling a bootstrap eSIM profile on the eUICC of the wireless device, after disabling the device-incompatible eSIM profile, when no device-compatible eSIM profile is enabled on the eUICC.

3. The method of claim 1, wherein the device-incompatible eSIM profile comprises a subscription permanent identifier (SUPI) comprising a value other than an international mobile subscriber identifier (IMSI) value.

4. The method of claim 1, wherein the device-incompatible eSIM profile comprises a non-third generation partnership project (non-3GPP) application and excludes a cellular wireless universal SIM (USIM) application.

5. The method of claim 1, wherein the detected error condition comprises determining the device-incompatible eSIM profile includes a 3GPP application code having a '100B' value.

6. The method of claim 1, further including:

by the wireless device:

downloading, from the provisioning server after sending the notification message indicating the incompatibility of the device-incompatible eSIM profile, a device-compatible eSIM profile; and installing the device-compatible eSIM profile on the eUICC of the wireless device, wherein the device-compatible eSIM profile excludes the one or more optional features of the wireless communication standard.

7. The method of claim 6, wherein the notification message comprises an error code indicating the incompatibility of the device-incompatible eSIM profile regarding the one or more optional features not supported by capabilities of the wireless device.

8. An apparatus comprising:

one or more processors; and memory coupled to the one or more processors, the memory storing instructions for device-incompatible electronic Subscriber Identity Module (eSIM) profile provisioning error mitigation for a wireless device, wherein the apparatus is configured to:

download, from a provisioning server, a device-incompatible eSIM profile;

install, on an embedded universal integrated circuit card (eUICC) of the wireless device, the device-incompatible eSIM profile;

detect an error condition during initialization of the device-incompatible eSIM profile installed on the eUICC;

disable the device-incompatible eSIM profile;

send, to the provisioning server, a notification message indicating incompatibility of the device-incompatible eSIM profile; and provide, via a user interface of the wireless device, a user notification indicating the incompatibility of the device-incompatible eSIM profile provisioned to the wireless device and directing a user of the wireless device to contact a mobile network operator (MNO) from which the device-incompatible eSIM profile originated to determine next steps to obtain a device-compatible eSIM profile, wherein the device-incompatible eSIM profile includes one or more optional features of a wireless communication standard unsupported by the wireless device.

9. The apparatus of claim 8, wherein the apparatus is further configured to:

enable a bootstrap eSIM profile on the eUICC of the wireless device, after disabling the device-incompatible eSIM profile, when no device-compatible eSIM profile is enabled on the eUICC.

10. The apparatus of claim 8, wherein the device-incompatible eSIM profile comprises a subscription permanent identifier (SUPI) comprising a value other than an international mobile subscriber identifier (IMSI) value.

11. The apparatus of claim 8, wherein the device-incompatible eSIM profile comprises a non-third generation partnership project (non-3GPP) application and excludes a cellular wireless universal SIM (USIM) application.

12. The apparatus of claim 8, wherein the detected error condition comprises determining the device-incompatible eSIM profile includes a 3GPP application code having a '100B' value.

13. The apparatus of claim 8, wherein the apparatus is further configured to:

download, from the provisioning server after sending the notification message indicating the incompatibility of the device-incompatible eSIM profile, a device-compatible eSIM profile; and install the device-compatible eSIM profile on the eUICC of the wireless device, wherein the device-compatible eSIM profile excludes the one or more optional features of the wireless communication standard.

14. The apparatus of claim 13, wherein the notification message comprises an error code indicating the incompatibility of the device-incompatible eSIM profile with configuration of the wireless device.

15. A non-transitory computer-readable storage medium storing instructions for device-incompatible electronic Subscriber Identity Module (eSIM) profile provisioning error mitigation for a wireless device, the instructions, when executed by one or more processors, cause to perform:

downloading, from a provisioning server, a device-incompatible eSIM profile;

installing, on an embedded universal integrated circuit card (eUICC) of the wireless device, the device-incompatible eSIM profile;

detecting an error condition during initialization of the device-incompatible eSIM profile installed on the eUICC;

disabling the device-incompatible eSIM profile;

sending, to the provisioning server, a notification message indicating incompatibility of the device-incompatible eSIM profile; and providing, via a user interface of the wireless device, a user notification indicating the incompatibility of the device-incompatible eSIM profile provisioned to the wireless device and directing a user of the wireless device to contact a mobile network operator (MNO) from which the device-incompatible eSIM profile originated to determine next steps to obtain a device-compatible eSIM profile, wherein the device-incompatible eSIM profile includes one or more optional features of a wireless communication standard unsupported by the wireless device.

16. The non-transitory computer-readable storage medium of claim 15, wherein the instructions, when executed by the one or more processors, further cause to perform:

enabling a bootstrap eSIM profile on the eUICC of the wireless device, after disabling the device-incompatible eSIM profile, when no device-compatible eSIM profile is enabled on the eUICC.

17. The non-transitory computer-readable storage medium of claim 15, wherein the instructions, when executed by the one or more processors, further cause to perform:

downloading, from the provisioning server after sending the notification message indicating the incompatibility of the device-incompatible eSIM profile, a device-compatible eSIM profile; and installing the device-compatible eSIM profile on the eUICC of the wireless device, wherein the device-compatible eSIM profile excludes the one or more optional features of the wireless communication standard.

* * * * *